US012042460B2

(12) United States Patent
Liu et al.

(10) Patent No.: US 12,042,460 B2
(45) Date of Patent: Jul. 23, 2024

(54) SEXUAL STIMULATION MASSAGE APPARATUS

(71) Applicant: HYTTO PTE. LTD, Singapore (SG)

(72) Inventors: Dan Liu, Guangdong (CN); Jilin Qiu, Guangdong (CN)

(73) Assignee: HYTTO PTE. LTD., Singapore (SG)

( * ) Notice: Subject to any disclaimer, the term of this patent is extended or adjusted under 35 U.S.C. 154(b) by 0 days.

(21) Appl. No.: 18/385,180

(22) Filed: Oct. 30, 2023

(65) Prior Publication Data

US 2024/0122790 A1 Apr. 18, 2024

Related U.S. Application Data

(63) Continuation of application No. 17/968,463, filed on Oct. 18, 2022, now Pat. No. 11,833,102.

(51) Int. Cl.
*A61H 19/00* (2006.01)

(52) U.S. Cl.
CPC ..... *A61H 19/44* (2013.01); *A61H 2201/0153* (2013.01); *A61H 2201/018* (2013.01); *A61H 2201/1215* (2013.01); *A61H 2201/149* (2013.01); *A61H 2201/1664* (2013.01); *A61H 2201/5058* (2013.01)

(58) Field of Classification Search
CPC .................. A61H 2201/1418; A61H 2201/149
See application file for complete search history.

(56) References Cited

U.S. PATENT DOCUMENTS

| | | | | |
|---|---|---|---|---|
| 11,253,423 | B1 * | 2/2022 | Williams | A61H 23/0254 |
| 2002/0065477 | A1 | 5/2002 | Boyd et al. | |
| 2005/0113636 | A1 | 5/2005 | Tucker | |
| 2008/0194907 | A1 | 8/2008 | Lin et al. | |
| 2010/0305399 | A1 | 12/2010 | Stephenson | |
| 2015/0148592 | A1 | 5/2015 | Kanbar et al. | |
| 2015/0305972 | A1 * | 10/2015 | Blenk | A61H 9/0071 601/72 |
| 2016/0045392 | A1 | 2/2016 | Massey et al. | |
| 2017/0105896 | A1 | 4/2017 | Derwin et al. | |
| 2022/0331198 | A1 | 10/2022 | Dietrich et al. | |

FOREIGN PATENT DOCUMENTS

| | | |
|---|---|---|
| KR | 20200084184 A | 7/2020 |

* cited by examiner

*Primary Examiner* — Thaddeus B Cox
(74) *Attorney, Agent, or Firm* — Holtz, Holtz & Volek PC

(57) ABSTRACT

A sexual stimulation massage apparatus includes a body, and a reciprocating motion structure disposed within the body. The reciprocating motion structure includes a rotational structure and a linear motion structure that are mechanically coupled with each other. A motor includes a rotating shaft which is mechanically coupled with the rotational structure to rotate the rotational structure. The reciprocating motion structure imparts a reciprocating motion to the linear motion structure. A stimulating structure is operatively coupled with the linear motion structure. The stimulating structure is configured to contact with a human body and provide sexual stimulation to the human body based on the reciprocating motion of the linear motion structure. A power source is configured to provide electric power to the motor for rotating the rotating shaft. A controller is configured at least to control the operation of the motor.

9 Claims, 6 Drawing Sheets

SEXUAL STIMULATION MASSAGE APPARATUS

CROSS REFERENCE TO RELATED APPLICATION

This application is a Continuation of U.S. patent application Ser. No. 17/968,463, filed on Oct. 18, 2022, and issued as U.S. Pat. No. 11,833,102, on Dec. 5, 2023, the entire contents of which are incorporated herein by reference.

TECHNICAL FIELD

The present disclosure relates to sexual aid devices and, more particularly relates, to the massagers for engaging and sexually stimulating the human body, particularly the female genitals.

BACKGROUND

Sexual stimulating massage is used to develop and enhance sexual arousal in the human body. A sexual stimulator creates sexual stimulation by engaging the stimulator in sensitive erogenous zones of the human body for sexual pleasure. For instance, the sexual stimulator can be used for creating sexual pleasure in various body parts such as the vulva, clitoris, vagina, and the like.

A variety of sexual stimulation massagers such as sex toys, adult toys, dildos, etc., are available in the market for performing a variety of functions, ranging from medical therapy to erotic stimulation. The stimulating massagers are designed to provide massaging effects through several operations like vibration, expansion and contraction, suction, etc. However, the movement of these sexual stimulation massagers is fairly limited. Also, the currently available stimulating massagers are not designed specifically to accommodate the physiologies of different kinds of users while stimulating more than one area of the body simultaneously and providing independent user control of the stimulation. Also, it is noted that the conventional stimulating massagers have a short service life and need to be replaced after a relatively short time due to the design of the movement mechanisms.

Therefore, there exists a need for a sexual stimulation massage apparatus with an improved mechanism of movement to enhance sexual arousal on the user's body.

SUMMARY

Various embodiments of the present disclosure provide a sexual stimulation massage apparatus for providing sexual stimulation and enhancing sexual arousal on the user's body.

In an embodiment, a sexual stimulation massager is disclosed. The sexual stimulation massage apparatus includes a body. A reciprocating motion structure is disposed within the body. The reciprocating motion structure includes a rotational structure and a linear motion structure mechanically coupled with each other. A motor including a rotating shaft is mechanically coupled with the rotational structure to rotate the rotational structure. The reciprocating motion structure imparts a reciprocating motion to the linear motion structure. A stimulating structure is operatively coupled with the linear motion structure. The stimulating structure is configured to contact a human body and provide sexual stimulation to the human body based on the reciprocating motion of the linear motion structure. A power source is configured to provide electric power to the motor for rotating the rotating shaft. A controller is configured to control the operation of the motor.

BRIEF DESCRIPTION OF THE FIGURES

The following detailed description of illustrative embodiments is better understood when read in conjunction with the appended drawings. To illustrate the present disclosure, exemplary constructions of the disclosure are shown in the drawings. However, the present disclosure is not limited to a specific device, or a tool and instrumentalities disclosed herein. Moreover, those in the art will understand that the drawings are not to scale.

Figure 1:
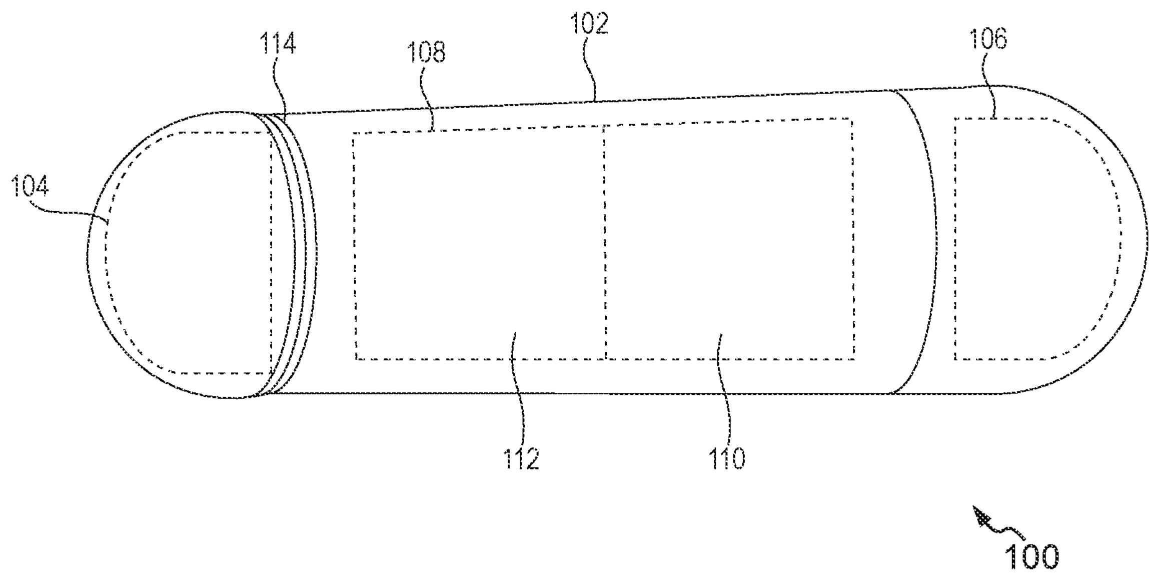
FIG. 1 illustrates a perspective view of a sexual stimulation massage apparatus, in accordance with an embodiment of the present disclosure.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Reference in this specification to "one embodiment" or "an embodiment" means that a particular feature, structure, or characteristic described in connection with the embodiment is included in at least one embodiment of the present disclosure. The appearances of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

Various examples of the present disclosure provide sexual stimulation massage apparatus. In an embodiment, a sexual stimulation massage apparatus includes a main body. The body includes a reciprocating motion structure configured to provide movement to a stimulating structure. The reciprocating motion structure includes a rotational structure and a linear motion structure. The rotational structure is rotated by a rotating shaft of a motor. The motor is configured to receive electric power from a power source to rotate the rotational structure. The rotational structure converts rotational motion into reciprocating motion of the linear motion structure. The linear motion structure includes a moving rod configured to reciprocate within a limiting structure. The limiting structure guides the moving rod to reciprocate in a specified direction. The stimulating structure may be integrated, coupled, or be in intermittent contact with the moving rod. In one form, when the stimulating structure is not physically coupled with the moving rod, an impact occurs due to the reciprocation of the moving rod into the stimulating structure. In another form, when the stimulating structure is physically coupled with the moving rod of the linear motion structure, both the moving rod and the stimulating structure get reciprocated. The movement of a part of the stimulating structure may be used on one or more areas of the user's body such as vulva, clitoris, vagina, and the like.

In one embodiment, the stimulating structure includes at least one of stimulation massager, a vibrator, a heater, a bellow, and a suction cup. Introducing these stimulating components within the stimulating structure may cause sexual stimulation to the vagina and clitoris of the female body. The stimulation effect includes, but is not limited to, a thrusting stimulation, a vibration stimulation, a temperature stimulation, a rotation stimulation, a sucking stimulation, an expansion and contraction stimulation, a telescopic stimulation, and an impact stimulation. A controller controls the rotational speed of the motor by controlling the power supplied to the motor. The electric power is supplied to the motor through a power source. The power source may be an electrical connection or a battery. The controller controls the rotational speed of the motor based on the input provided by the user. The input is provided through a knob positioned on the body or through a wireless connection. The stimulating structure also includes a sensing element enabled to measure at least one of a pressure parameter, a temperature parameter, and a humidity parameter of the user's body part to be stimulated. Based on the acquired data from the sensing element, the data is sent to the controller. Based on a predefined program, the controller adjusts the operational parameter of the stimulating structure. With respect to the speed of the rotation of the motor having a rotating shaft, the frequency of reciprocation of the stimulator changes. For example, in one predefined program, the reciprocation frequency of the reciprocating motion structure may operate in the range of 1000 to 3000 cycles/min. Further, based on the mechanism of the reciprocating motion structure, the stroke of the moving rod is varied, which provides a sexual sensation to the user.

Various example embodiments of the present disclosure are described hereinafter with reference to FIG. 1 to FIG. 8.

FIG. 1 illustrates a perspective view of a sexual stimulation massage apparatus 100 (hereinafter referred to as 'massage apparatus' or 'massager'), in accordance with an embodiment of the present disclosure. The massage apparatus 100 is designed for providing sexual stimulation and enhancing sexual arousal on the user's body. Specifically, the massage apparatus 100 is designed to accommodate the physiologies of different kinds of users while simultaneously stimulating more than one area of the users' body and providing independent user control of the stimulation.

The massage apparatus 100 includes a body 102 and a stimulating structure 104. The body 102 is configured to accommodate at least a grip structure 106 and a reciprocating motion structure 108. The reciprocating motion structure 108 includes a rotational structure 110 and a linear motion structure 112. The body 102 acts as a housing to cover one or more components incorporated therein. The body 102 is constructed in a manner to be split at least into two parts. The split parts I.E. a top part and a bottom part may be assembled together using openable joints. In an example, glue may be applied on the border of contacting surfaces of the top and bottom parts to form the body 102. It should be noted that the shape of the body 102 is not limited to that shown in FIG. 1, and can take any other forms and shapes. For instance, the body 102 may be constructed to form the shape of a sexual stimulator such as a sex toy, an adult toy, a dildo, and the like. The material used for the body 102 is soft and lightweight material that does not cause injury or infection to the user's body. For example, the materials such as silicon, borosilicate glass, Lucite, stainless steel, etc., can be used to fabricate the body 102. In one configuration, a silicone gel may be applied along at least a part of the body 102.

The outer surface of the grip structure 106 may be constructed to form a gripper for holding the body 102 tightly while performing sexual stimulation. The grip structure 106 may be formed with grooves, textures, cross patterns, or a combination thereof to provide a frictional effect to the user's palm during holding. The gripped surface assists in transmitting the force applied by the user and eliminating the chances of slippage from the user's palm.

The stimulating structure 104 is operatively coupled with the body 102 by means of a suitable temporary joint. As shown in the illustrated representation of FIG. 1, a seal ring 114 is used to couple the stimulating structure 104 with the body 102. The operable connection between the stimulating structure 104 and the reciprocating motion structure 108 is explained further in detail with respect to FIGS. 2A-2B.

The attachment and detachment capability of the stimulating structure 104 with the body 102 provides ease in the cleaning of the stimulating structure 104. The cleaning of the stimulating structure 104 assists in maintaining the hygiene level of the massage apparatus 100. The stimulating structure 104 is replaceable and different kinds of stimulating structure 104 may be attached with the reciprocating motion structure 108 of the body 102 as per the need of the user. The stimulating structure 104 may be configured in a variety of shapes and configurations to accommodate massagers of different sizes and lengths. The stimulating structure 104 may satisfy the functionality that includes a stimulator extension length, a stimulator expansion and contraction, a stimulator vibration, a stimulator temperature sensation, and the like. The body 102 may be in continuous contact or in intermittent contact with the stimulating structure 104 which will be discussed further in detail.

In a non-limiting configuration, the grip structure 106, the reciprocating motion structure 108, and the stimulating structure 104 have the same longitudinal axes. However, it should be noted that the present disclosure is not limited to this orientation and these components may be configured or coupled with each other in a different manner as per the feasibility and requirement. For instance, the orientation of the grip structure 106 and the reciprocating motion structure 108 with respect to the stimulating structure 104 may be different. Based on the coupling mechanism between the grip structure 106 and the reciprocating motion structure 108, the angle of orientation between these two can be changed. The grip structure 106 may be coupled orthogonally or obliquely with the reciprocating motion structure 108 using a suitable coupling mechanism.

Figure 2A:
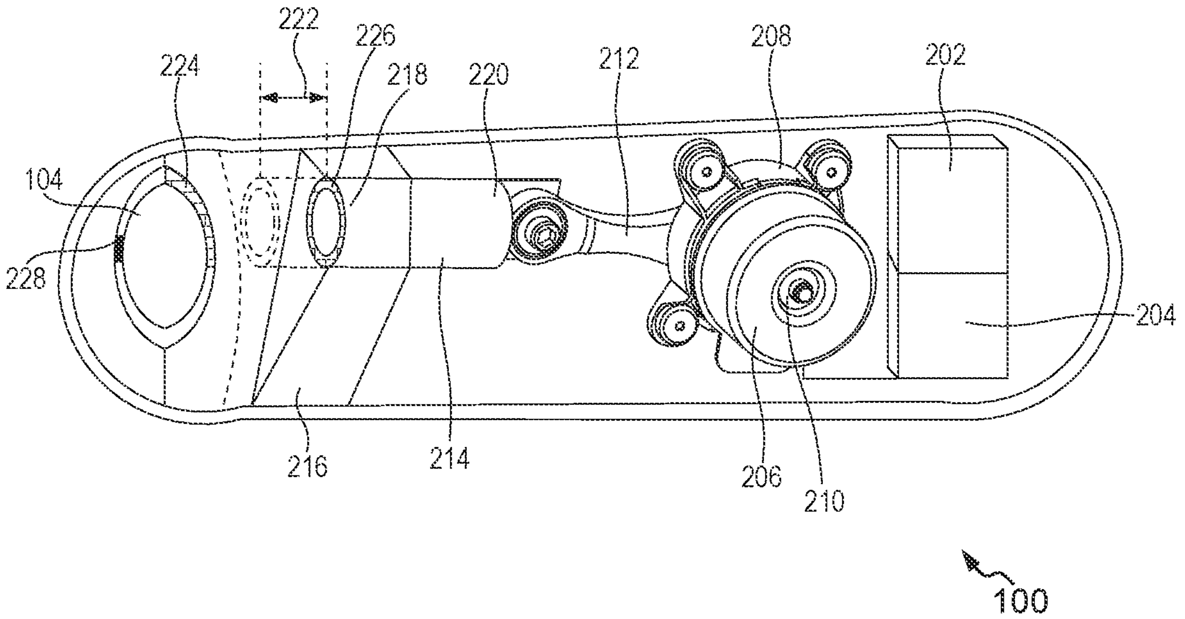
FIGS. 2A and 2B illustrate a schematic representation of a sexual stimulation massage apparatus, in accordance with an embodiment of the present disclosure.

FIG. 2A illustrates a schematic representation of an internal configuration of the massage apparatus 100, in accordance with an embodiment of the present disclosure. The grip structure 106 includes a power source 202, a controller 204, and a motor 206. The power source 202 is coupled to the motor 206 through the controller 204. The power source 202 is configured to provide electrical power to the motor 206 utilized for providing movement to the rotational structure 110. The power source 202 is capable of providing an alternating current (AC) or a direct current (DC) as per the configuration of the motor 206. In another configuration, the power source 202 may be a battery (E.G., a lithium-ion battery) to drive the motor 206. The controller 204 controls the power supply to the motor 206. Based on regulating the power supply to the motor 206, the rotational speed of the motor 206 can be changed. In an example, the controller 204 regulates a voltage or a current supplied to the motor 206, which in turn regulates the rotational speed of the motor 206.

The motor 206, disposed within the body 102, is compact in design and serves the purpose of converting electrical energy into mechanical motion (I.E. movement of the motor shaft). The housing of the motor 206 is assembled tightly with an inner surface of the body 102 using a suitable fastener. In one configuration, a screw joint may be used to assemble the motor 206 with the body 102. The body 102 acts as a damper to absorb the vibration of the motor 206 that occurs during the running conditions. The motor 206 includes a casing 208 configured to cover the components and reduce the noise of the motor 206 generated during its operation. The motor 206 includes a rotating shaft 210 configured to rotate at one of the preset rotational speeds. The rotating shaft 210 of the motor 206 may be cylindrical in shape that is designed based at least on a torsional shear force, a bending moment, and a fatigue loading.

In an embodiment, the rotational structure 110 is positioned on the rotating shaft 210 of the motor 206. A rotational motion of the rotational structure 110 imparts a reciprocating motion to the linear motion structure 112 because of their coupling. It should be noted that the reciprocating motion of the linear motion structure 112 engages the stimulating structure 104 depending upon the operable coupling of the linear motion structure 112 and the stimulating structure 104. In one form, the rotating shaft 210 is mounted on a bearing disposed at least at each end of the rotating shaft 210. Each of the bearings is integrated with a pedestal assembled to the inner surface of the body 102. The pedestal includes a bearing housing for accommodating the bearing configured to support the rotating shaft 210. The bearing used for supporting the rotating shaft 210 may be one of a roller bearing, a ball bearing, a journal bearing, or a magnetic bearing. The bearing is configured to support the load of the rotating shaft 210 and the rotational structure 110. Also, the bearing is designed to eliminate friction and vibration generated during the operation of the rotating shaft 210.

In another embodiment, the rotational structure 110 is mounted on a driven shaft (not shown in FIGS.). In this configuration, the rotating shaft 210 of the motor 206 (I.E. a driver shaft) is coupled to the driven shaft using a suitable coupling. Such a coupling is configured to transfer mechanical power from the rotating shaft 210 to the rotational structure 110. The coupling may include a bore on each of the sides to accommodate and fix the rotating shaft 210 and the driven shaft using a fastener like a key joint. Some examples of the coupling used to couple the rotating shaft 210 with the driven shaft may include a flange coupling, a sleeve coupling, a flexible coupling, a universal coupling, and the like. The coupling geometry can be defined by considering an installation error such as angular misalignment, lateral misalignment, etc., and mechanical flexibility while coupling the rotating shaft 210 with the driven shaft. The coupling also provides mechanical flexibility and tolerance for shaft misalignments. In another embodiment, the rotating shaft 210 may be coupled to the driven shaft of the rotational structure 110 using one of a power transmission mechanism such as a gearbox arrangement, a belt drive arrangement, a chain drive arrangement, and the like. In one example, the gearbox containing a set of gears provides a sturdy connection, an increased torque, and a velocity ratio as per the user's need. In addition, the rotating shaft 210 and the driven shaft may be oriented in different directions. In one scenario, the gearbox having a bevel gear connects the shafts whose axes lie at a right angle with each other. Based on these mechanisms, a geometrical configuration of the grip structure. 106 with respect to the reciprocating motion structure 108 may be oriented at an angular position.

The rotational structure 110 includes a cam (shown in FIG. 3) designed to fasten mechanically with a connection link 212. The connection link 212 is configured to transmit the rotational motion into the reciprocating motion to drive the linear motion structure 112. In one configuration, the cam is eccentrically positioned on a rotational center of the rotating shaft 210. The connection link 212 couples the rotational structure 110 to a moving rod 214 of the linear motion structure 112. The geometrical configuration of the rotational structure 110 is explained further in detail with respect to FIG. 3.

The linear motion structure 112 includes the moving rod 214 configured to reciprocate through a limiting structure 216. The moving rod 214 is made up of a cylindrical shape which is easier to fabricate. In another configuration, the moving rod 214 may be constructed to form a shape of a stimulating member. The limiting structure 216 is fixed within the inner surface of the body 102 through a suitable fastener and oriented along a sliding direction of the moving rod 214. The moving rod 214 slides within the limiting structure 216 in a linear direction. Therefore, an inner profile of the limiting structure 216 is identical to that of the moving rod 214.

A sliding motion between the moving rod 214 and the limiting structure 216 takes place with a minimum loss in energy that is consumed to overcome sliding friction and stickiness of mating surfaces. In one configuration, a clearance fit is provided in between the moving rod 214 and the limiting structure 216 for ease of sliding. Further, an outer surface of the moving rod 214 may be formed with a layer of material (i.e. coating) that provides sliding movement within the limiting structure 216 with the least friction and stickiness. In another configuration, at least one ring may be wrapped over a groove fabricated along the periphery of the moving rod 214. The ring is configured to eliminate the direct surface contact of the moving rod 214 with the limiting structure 216. The ring is made up of a soft material such as ductile iron which is flexible and resistant to heat. Based on the sliding motion between the ring and the limiting structure 216, the outer surface of the ring may get worn out without causing damage to the moving rod 214 and the limiting structure 216. Alternatively, suitable lubricants such as solid lubricants, semi-solid lubricants, or oil lubricants may be used for allowing the sliding motion of the moving rod 214 within the limiting structure 216. The sliding motion of the moving rod 214 is further transferred to the stimulating structure 104 utilized by the user for sexual stimulation.

The stimulating structure 104 is operatively coupled with the moving rod 214 of the linear motion structure 112. The stimulating structure 104 is configured to contact a human body and provide sexual stimulation based on the reciprocating motion of the moving rod 214. As shown in FIG. 2A, the stimulating structure 104 is positioned adjacent to a proximal end 218 of the moving rod 214, and a distal end 220 of the moving rod 214 is coupled to the connection link 212. The stimulating structure 104 is fixed along the reciprocating direction of the moving rod 214. In one scenario, the stimulating structure 104 is held at an area of the user's body where sexual stimulation is desired (e.g., vagina). Based on the reciprocation of the moving rod 214 of the linear motion structure 112, the proximal end 218 of the moving rod 214 reciprocally impacts the stimulus member of the stimulating structure 104 by the configuration of a suitable stroke length 222. The impact generated while reciprocating motion (e.g., as per stroke length 222) creates sexual stimulation in the human body. In one example, the stroke length of the linear motion structure 112 includes about 3 mm to about 15 mm. The frequency of impact of the moving rod 214 on the stimulating structure 104 depends upon the operating speed of the motor 206 and the configuration of the reciprocating motion structure 108. For example, when the rotational speed of the motor 206 increases, the frequency of the reciprocating motion is high, which may create a high impact of sexual stimulation. In contrast, when the rotational speed of the motor 206 decreases, the frequency of the reciprocating motion is low, which may reduce the impact of stimulation.

The stimulating structure 104 may include a stimulating member (e.g., phallic-shaped configuration) for stimulating one or more erogenous zones and/or the genital organs of the user's body. The stimulating structure 104 may also include a sex toy, an adult toy, or an internal massager configured to extend in a linear motion for creating a more realistic thrusting sensation in the vagina of the female body. Also, the stimulating structure 104 may accommodate a vibrator attached to or molded at a position to provide clitoral stimulation. The vibrator of the stimulating structure 104 may be electrically coupled with the controller 204 for altering the vibration intensity of the vibrator. The controller 204 is operated by the user. Also, the vibrator head may be interchangeable and may attach and detach with the seal rings 114 based on the fact that the stimulating structure 104 may be integrated, coupled, or in intermittent contact with the moving rod 214. In addition, the stimulating structure 104 may include a heating unit (e.g., a peltier unit, a heater, etc.) for changing the operating temperature of the stimulating structure 104. Other than this, the stimulating structure 104 may include a suction cup for sucking stimulation, a rotary mechanism for rotational stimulation, and expansion and contraction of the stimulator using a bellow. The bellow creates expansion and contraction of the stimulating member. The extension of the stimulating massager along with the expansion and contraction mechanism is advantageous for more realistic sensation and pleasure to the human body. An electric power supply is provided to operate these stimulators.

Further, the stimulating structure 104 includes conductive contacts 224. The conductive contacts 224 are configured to receive the electric power from a contact base 226 formed or integrated at the proximal end 218 of the moving rod 214. The contact base 226 is electrically connected to the power source 202. Using this arrangement, one or more components of the stimulating structure 104 are operated by receiving electric power from the power source 202. As the power source 202 is coupled with the controller 204, the amount of electric power required to operate the components of the stimulating structure 104 is adjusted by the controller 204.

Moreover, the stimulating structure 104 includes a sensing element 228. The sensing element 228 is configured to detect the preset parameters of the stimulating structure 104 that is in contact with the human body. The preset parameters include at least one of a pressure parameter, a temperature parameter, and a humidity parameter. In an example, the pressure of the area of the human body, to be stimulated, is measured using a suitable pressure sensor. The temperature of the area of the human body to be stimulated may be measured using a thermocouple. The humidity i.e. moisture content of the area of the human body to be stimulated may be measured using a humidity sensor. Based on the data acquired from one or more of these sensors of the sensing element 228, one or more feedback signals representing the preset parameters are sent to the controller 204 to generate a control signal for adjusting the motion parameters (e.g., the stroke length 222) of the reciprocating motion structure 108 and/or the stimulating parameters of the stimulating structure 104.

Figure 2B:
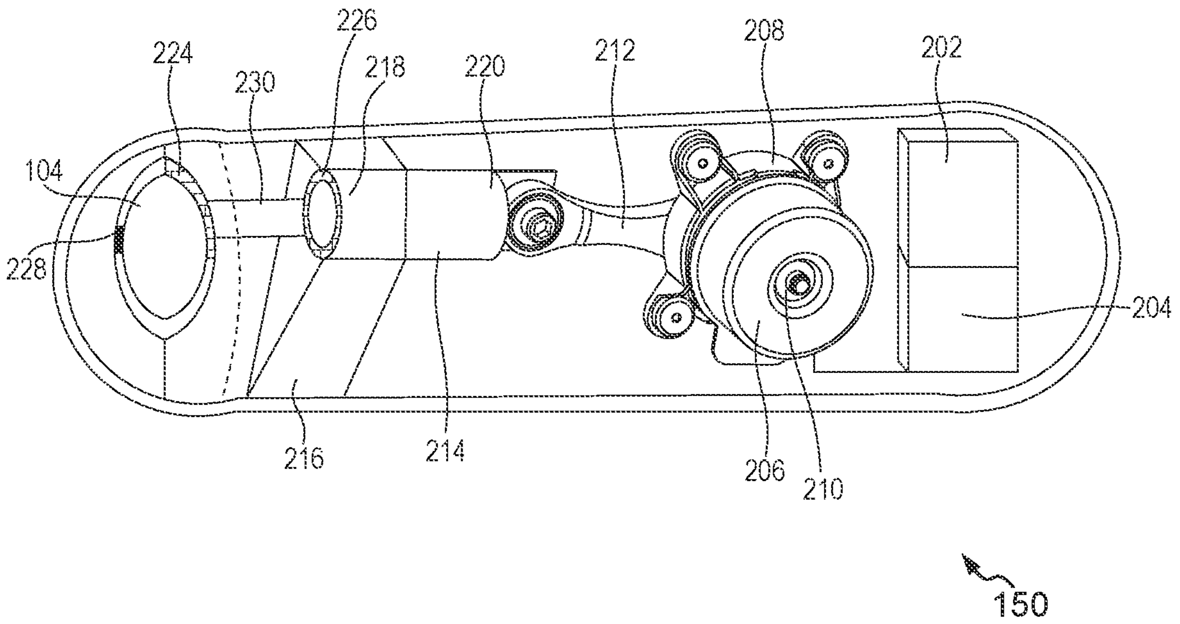

FIG. 2B illustrates a schematic representation of an internal configuration of a massage apparatus 150, in accordance with another embodiment of the present disclosure. In this embodiment, the stimulating structure 104 is mechanically coupled with the moving rod 214 of the linear motion structure 112 using a suitable connecting member 230. The moving rod 214 also reciprocates the stimulating member of the stimulating structure 104 because of the coupling provided by the connecting member 230. The reciprocation of stimulating member creates a telescopic stimulation effect on the human body. In one form, the connecting member 230 may be a suitable fastener like a pin joint. The connecting member 230 in this form is a separate member disposed to couple the moving rod 214 with the stimulating structure 104. In another form, the connecting member 230 may be integrated with the stimulating structure 104. The connecting member 230 is mechanically coupled with the moving rod 214 to operate the stimulating structure 104.

In another configuration, the stimulating structure 104 may be integrated with the moving rod 214 and is configured to contact the human body and provide sexual stimulation. The stimulation effect that creates sensational pleasure on the user's body depends at least upon the change in displacement (E.G., the stroke length 222), velocity, and acceleration that occurs during the reciprocation of the stimulating structure 104 that is integrated with the moving rod 214.

In yet another configuration, the proximal end 218 of the moving rod 214 may be designed to form a shape of the sexual stimulator (E.G., sex toy, dildo, etc.) that reciprocates within the vagina of the female to create sensational pleasure to the user's body. To further enhance sexual pleasure, the moving rod 214 that acts as a sexual stimulator may include dimples, protrusion, and recesses over the outer surface of the moving rod 214 to create sexual stimulation in an effective manner.

Figure 3:
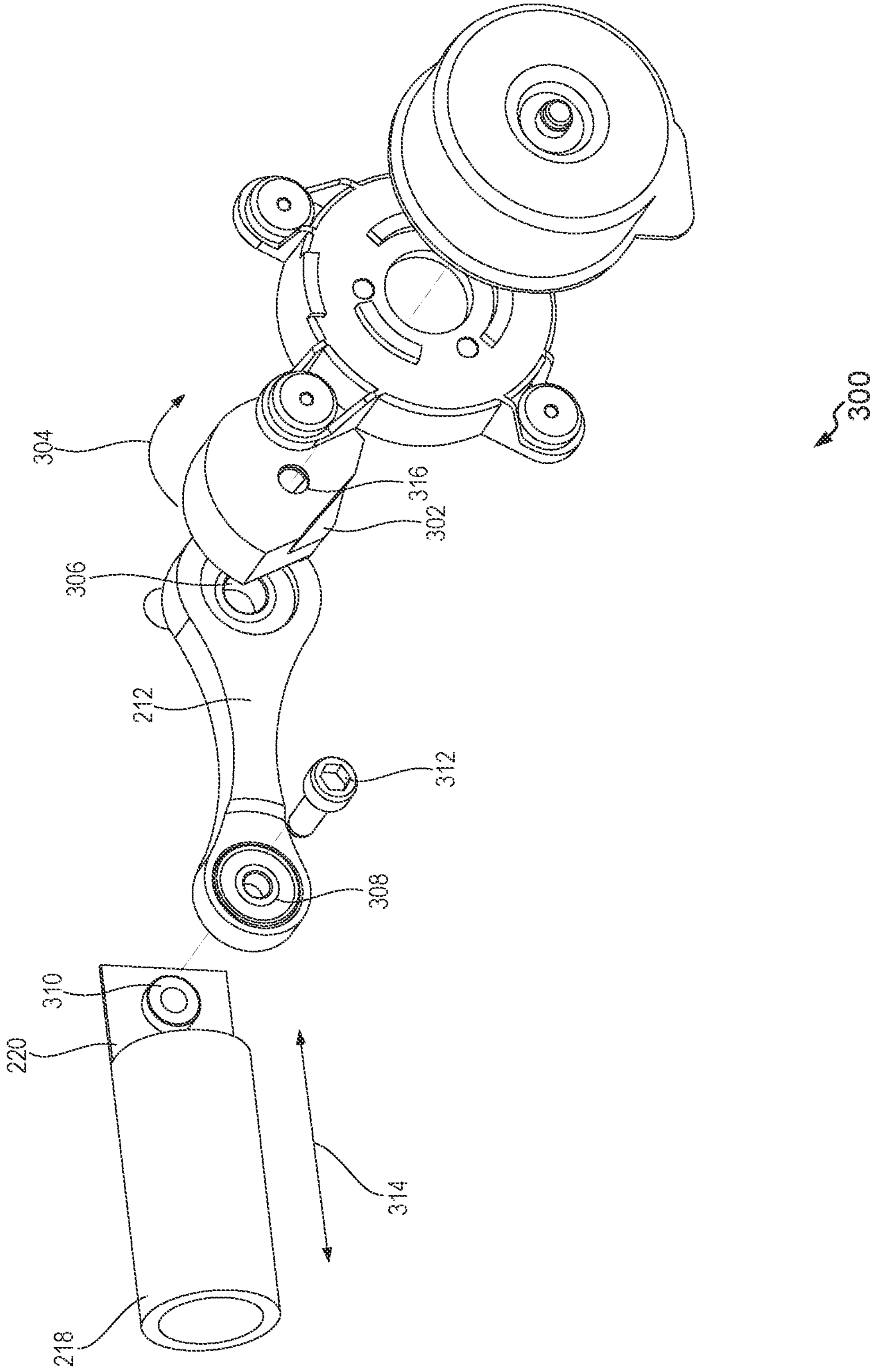
FIG. 3 illustrates an exploded view of a sexual stimulation massage apparatus, in accordance with an embodiment of the present disclosure.

FIG. 3 illustrates an exploded view 300 of internal components of the massage apparatuses 100 or 150, in accordance with an embodiment of the present disclosure. As shown, a cam 302 of the rotational structure 110 is a solid member constructed as a non-circular profile having a bore 316 for accommodating the rotating shaft 210. In one configuration, the rotating shaft 210 may be fixed within the bore 316 of the cam 302 using a suitable key joint. In another configuration, the rotating shaft 210 may fit within the bore 316 of the cam 302 using an interference fit. In other words, the cam 302 may press fit with the rotating shaft 210. Based on this arrangement, the relative motion between the rotating shaft 210 and the cam 302 can be eliminated.

The cam 302 may be constructed to form a circular or non-circular shape. The geometrical profile of the cam 302 is chosen based on maintaining the eccentricity between a central axis of the rotating shaft 210 and a central axis of the cam 302. For example, the cam 302 profile is non-circular when the central axis of the rotating shaft 210 coincides with the central axis of the cam 302. Furthermore, the shape of the cam 302 acts as a balance weight to counter the rotating mass of the connection link 212. It is noted that the forces exerted by the rotating mass (I.E. mass of the connection link 212) increase with the increase in the rotational speed of the rotating shaft 210, where the rotational speed of the rotating shaft 210 depends upon the reciprocation speed of the moving rod 214 configured to operate the stimulating structure 104. Therefore, an increase in the reciprocation speed of the moving rod 214 increases the need for shaft counterbalancing (I.E. profile of the cam 302).

As shown in the illustrated embodiment of FIG. 3, a first end 306 of the connection link 212 is mechanically coupled to the cam 302, where the cam 302 rotates in pre-specified direction 304. Further, a second end 308 of the connection link 212 is mechanically coupled to a distal end 220 of the moving rod 214. A suitable fastener like a nut 310 and a bolt 312 may be used to couple the distal end 220 of the moving rod 214 and the second end 308 of the connection link 212 while the first end 306 of the connection link 212 is coupled with the cam 302 using a suitable fastener like a wrist pin. Based on this arrangement, the moving rod 214 moves in a linear direction (E.G., see 314). The connection link 212 is designed to form a shape of a connecting rod used in an internal combustion engine. The connection link 212 is designed considering tension and compression load and fatigue loading experienced during operation.

In another embodiment, multiple connection links, such as the connection link 212, may be used to transfer mechanical power from the cam 302 to the moving rod 214 utilized to operate the stimulating structure 104 in a specified direction. The number of connection links required to drive the reciprocating motion structure 108 depends upon the stroke length 222 of the moving rod 214 I.E. distance traveled in the stroke length 222 to create sexual stimulation to the user's body.

Figure 4:
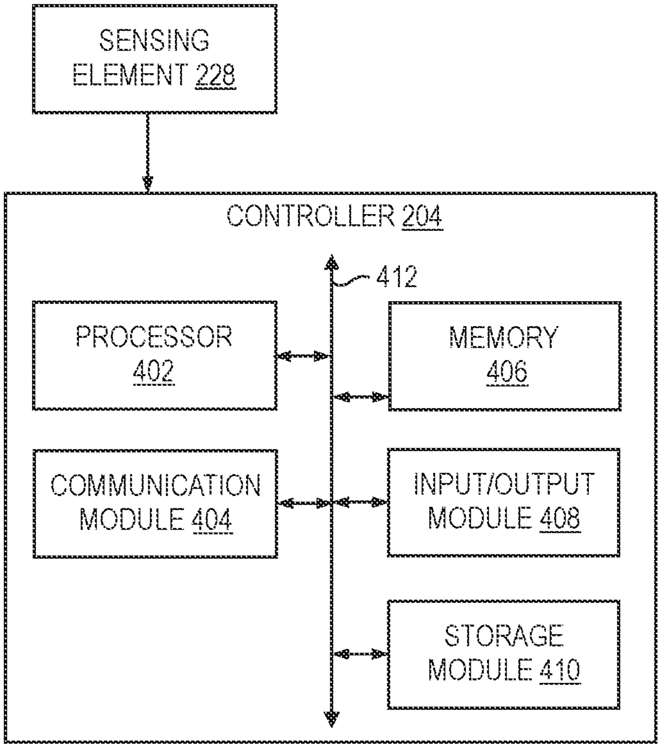
FIG. 4 is a block diagram of a controller for controlling the operation of one or more components of a sexual stimulation massage apparatus, in accordance with an embodiment of the present disclosure.

FIG. 4 is a block diagram of a controller 204 for controlling the operation of one or more components of the massage apparatus 100, in accordance with an embodiment of the present disclosure. The controller 204 includes a processor 402, a communication module 404, a memory 406, an input/output module 408, and a storage module 410. The memory 406 is configured to store mechanism-executable instructions. The processor 402 may be a single-core processor, a multi-core processor, and/or any combination thereof. The memory 406 may include one or more volatile memory devices, one or more non-volatile memory devices, and/or any combination thereof. In one embodiment, the memory 406 stores logic and/or instructions that are to be used by processor 402 for controlling at least the motor 206 and the stimulating structure 104. In one example, the memory 406 includes a program to regulate the rotational speed of the motor 206 based on the data acquired from preset parameters of the sensing element 228. The preset sensing parameters include one or more of: a pressure parameter, a temperature parameter, and a humidity parameter. Based on the acquired data from the sensing element 228, the feedback signal of the preset parameter is sent to the controller 204 through a suitable communication module 404 for generating a control signal to adjust the motion parameters (E.G., stroke, speed, etc.) of the reciprocating motion structure 108 and/or the stimulating parameters (E.G., impact, frequency of stimulation, etc.) of the stimulating structure 104.

The communication module 404 may include a communication circuitry having a transceiver circuitry that further includes an antenna and other communication media interfaces to connect with other devices like smartphones, computers, etc. The communication circuitry may, in at least some example embodiments, enable the reception of temperature data from a thermocouple of the sensing element 228 integrated within stimulating structure 104 that makes physical contact with the user's body part where stimulation is desired.

The input/output module 408 may include a mechanism that receives an input signal and provides an output signal to an operator of the controller 204. To that effect, the input/output module 408 may include one or more input interfaces and/or one or more output interfaces. The storage module 410 is any computer-operated hardware that is suitable for storing and/or retrieving data. The various components of the controller 204, such as the processor 402, the memory 406, the communication module 404, the input/output module 408, and the storage module 410 are configured to communicate with each other through a centralized circuit system 412.

Furthermore, a set of electrical switches may be installed around the body 102 for operating and controlling the working of the massage apparatus 100. The switches are electrically connected to the controller 204 which adjusts the rotational speed of the motor 206 as per the user's desire for sexual stimulation. In one configuration, a knob may be provided to regulate the speed of the motor 206. In addition, a LED (light emitting diode) light may be provided on the body, where the LED is operated by the controller 204 to notify the user about the power source 202. Other than this, knobs are provided on the body 102 for the user to adjust the vibration intensity of the vibrator, operating temperature of the heater, expansion and contraction rate of the bellow, and suction pressure of the suction cup. Each knob is electrically connected to the controller 204 such that the electric power supplied to these components of the stimulating structure 104 can be adjusted using knobs. The knobs and switches may be operated manually by the user or automatically using a suitable communication device. The communication devices such as a smartphone, a notebook, a desktop computer, etc., are communicably coupled to the controller 204. In one configuration, a Wi-Fi device may be used to connect the smartphone with the controller 204 to adjust the operating parameters of the stimulating structure 104.

Figure 5:
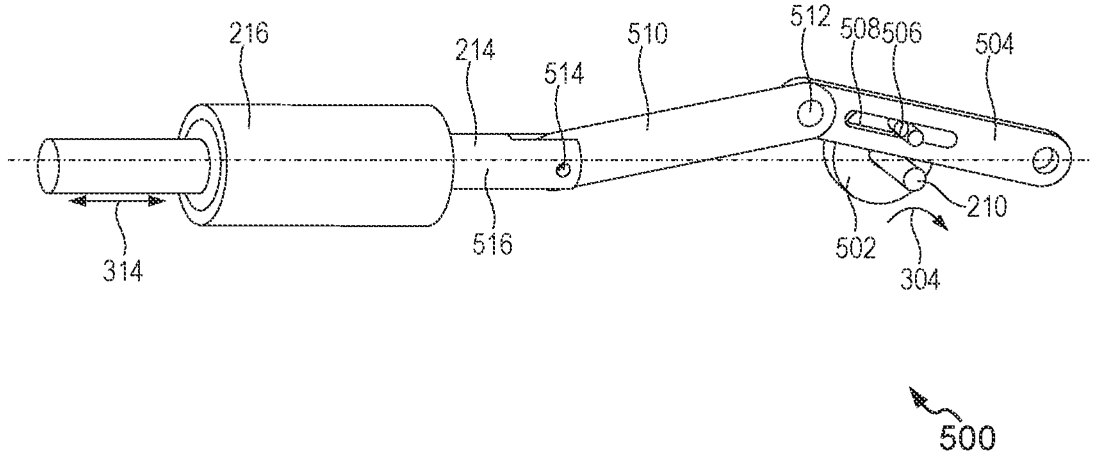
FIG. 5 illustrates a schematic representation of a reciprocating motion structure of a sexual stimulation massage apparatus according to an embodiment.

Different Embodiments of the Reciprocating Motion Structure of Stimulation Massage Apparatus:

FIG. 5 illustrates a schematic representation of a reciprocating motion structure 500 of a sexual stimulation massage apparatus 100 according to an embodiment. The rotational structure 110 includes an eccentric cam 502 mounted on the rotating shaft 210 configured to rotate in the pre-specified direction 304. The eccentric cam 502 is mechanically fastened with a connection point 506. The connection point 506 is eccentrically disposed with a rotation center of the eccentric cam 502. A first connection link 504 having a connection groove 508 is coupled with an eccentric cam 502 using the connection point 506. The first connection link 504 is detachably coupled with a second connection link 510 using a pivot joint 512. Further, the second connection link 510 is coupled with the moving rod 214 using a pivot joint 514. The pivot joints 512 and 514 provide easier detachment of the second connection link 510 from the first connection link 504 and the moving rod 214. The detached structure assists in repairing and/or replacing one or more components of the reciprocating motion structure 500.

The stroke length 222 of the moving rod 214 along a longitudinal axis 516 is dependent upon the position of the connection groove 508 at which connection point 506 of the eccentric cam 502 is secured. In one example, when the connection point 506 is secured at an end portion of the connection groove 508, the stroke length 222 of the moving rod 214 is maximum. In contrast, when the connection point 506 is secured at the start portion of the connection groove 508, the stroke length 222 of the moving rod 214 is minimum. Based on this configuration, the stroke length 222 of the moving rod 214 during reciprocating movement 314 can be varied for effective sexual stimulation.

Figure 6:
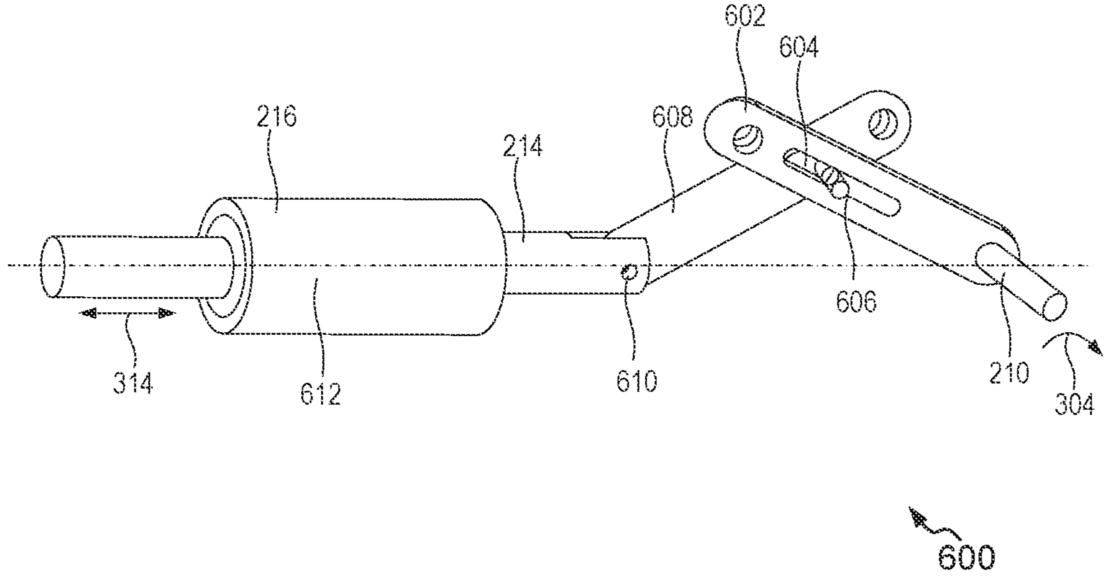
FIG. 6 illustrates a schematic representation of a reciprocating motion structure of a sexual stimulation massage apparatus according to another embodiment.

FIG. 6 illustrates a schematic representation of a reciprocating motion structure 600 of the sexual stimulation massage apparatus 100 according to another embodiment. The reciprocating motion structure 600 includes the rotating shaft 210 coupled with a crank 602 using a suitable fastener (E.G., a key joint). The rotating shaft 210 rotates the crank 602 along 360 degrees in the pre-specified direction 304. The rotary motion of the crank 602 is converted into the reciprocating movement 314 of the moving rod 214. The crank 602 is fabricated with a connection groove 604. The connection groove 604 is formed on the crank 602 to couple a link 608 using a connection point 606. The link 608 is coupled with the crank 602 at the specified position of the connection groove 604 using the connection point 606. The position of the connection point 606 that joins the crank 602 with link 608 decides the stroke length 222 of the moving rod 214. In one example, the link 608 is connected at an extreme end of the connection groove 604 formed on the crank 602 via the connection point 606. This configuration provides a maximum stroke length 222 of the moving rod 214.

In another scenario, when the link 608 is coupled at the intermediate position of the crank 602, the distance traveled by the moving rod 214 is constrained by a certain length. Specifically, the distance between the intermediate position and the end of the crank 602 is the constraint of the movement of the moving rod 214. Further, when the crank 602 rotates from one end to another along longitudinal axis 612, the minimum distance is traveled by the moving rod 214. Therefore, based on different configurations of the crank 602 mechanism, the stroke length 222 of the moving rod 214 can be altered. Due to this configuration, different kinds of stimulation effects can be generated.

Figure 7:
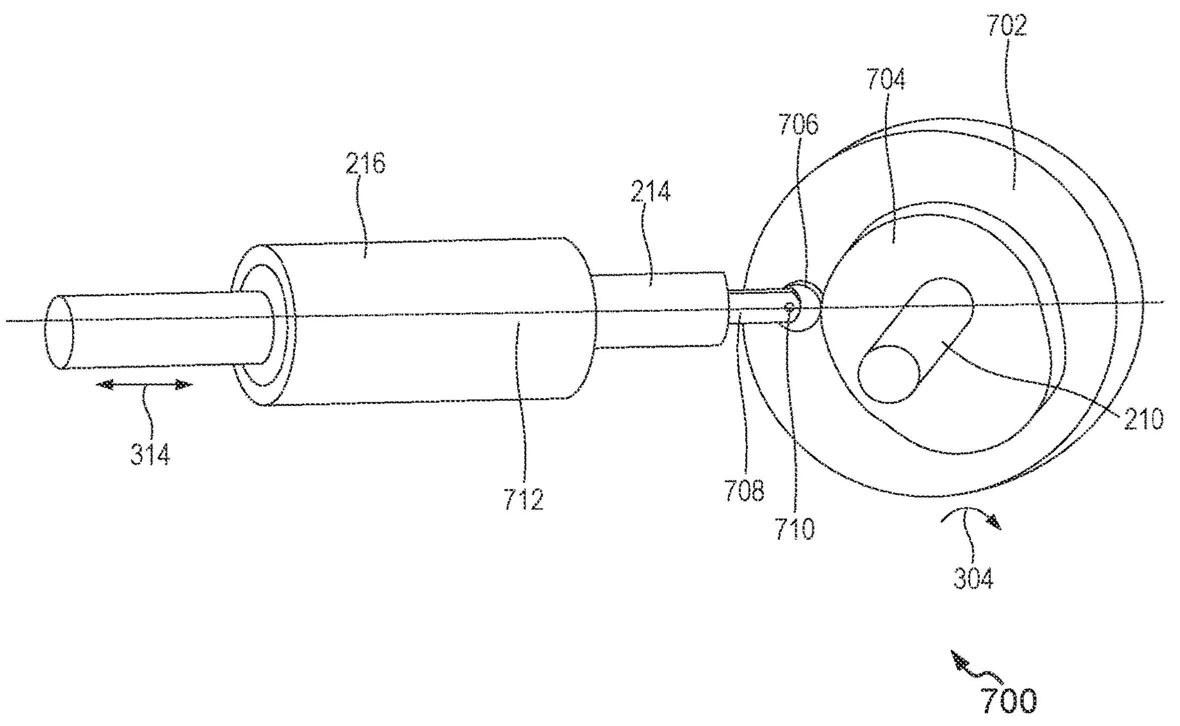
FIG. 7 illustrates a schematic representation of a reciprocating motion structure of a sexual stimulation massage apparatus according to another embodiment.

FIG. 7 illustrates a schematic representation of a reciprocating motion structure 700 of the sexual stimulation massage apparatus 100 according to another embodiment. As shown, the rotational structure 110 includes a wheel 702 fabricated with an eccentric groove 704. The eccentric groove 704 formed on the wheel 702 has cam like profile. Hereinafter, the eccentric groove 704 formed on the wheel 702 is referred to as a cam 704. It is noted that the profile of cam 704 is non-circular. The non-circular profile creates movement of a bump 706 while contacting with the cam 704. The cam 704 is formed on the outer surface of the wheel 702. In other configurations, the cam 704 may be formed in a middle section of the wheel 702.

In an embodiment, one of a disc cam, a concave cam, a convex cam, and a wedge cam may be used to provide reciprocating movement 314 to the moving rod 214 at variable frequency. It is noted that the traveling displacement, velocity, and acceleration of the moving rod 214 depend upon the geometrical profile of the cam 704. In the present configuration, the moving rod 214 remains motionless for about half of the cycle of the cam 704 where the cam profile is circular, and in the second half, it rises and falls. The rotating shaft 210 of the motor 206 rotates the cam 704. When the rotating shaft 210 rotates, the cam 704 creates lateral movement of the bump 706. Movement of the bump 706 creates movement of the moving rod 214.

The wheel 702 is fabricated with cam 704 may be positioned on the rotating shaft 210 using a suitable temporary joint. In an example, a key joint may be used to couple the wheel 702 with the rotating shaft 210. Both the rotating shaft 210 and the wheel 702 are fabricated with a keyway and a key seat to accommodate and fit the key. The key joint between the wheel 702 and the rotating shaft 210 eliminates the chances of relative motion that occurs during operation. In other words, the rotational speed of the rotating shaft 210 is the same as that of the wheel 702. In another example, an interference fit may be used to couple the wheel 702 with the rotating shaft 210. The interference fit between the wheel 702 and the rotating shaft 210 eliminates the chances of relative motion.

The bump 706 is used to transmit the rotary motion in the pre-specified direction 304 of the wheel 702 formed with the cam 704 into the reciprocating motion of the moving rod 214 coupled with the stimulating structure 104. The reciprocating movement 314 of the moving rod 214 moves the stimulating structure 104 at the same velocity. The stroke length 222 of the moving rod 214 depends upon the profile of the cam 704 formed on the wheel 702 and the eccentric distance provided between the axis of rotation of the rotating shaft 210 and the axis of the cam 704. The bump 706 may be integrated or coupled with the moving rod 214. A roller-type bump 706 is mounted on an axle 710 positioned at one end of the bar 708. The other end of the bar 708 is mechanically coupled with the distal end 220 of the moving rod 214. The force acquired while rotating the cam 704 is transmitted to the bump 706. Further, the force is transferred from the bump 706 to the moving rod 214 through the bar 708. In another configuration, one of a knife-edge bump, a flat-faced bump, and a spherical-faced bump profile may be used for creating surface contact with the cam 704.

In one embodiment, the center of the cam 704 and the line of action of the bump 706 are in the same axial line 712. Alternatively, the cam 704 center and the line of action of the bump 706 may be positioned eccentrically with each other. An impact generated by the cam 704 is transferred to the bump 706. The intensity of the impact generated is dependent upon the eccentricity between the center axis of the cam 704 and the axis of the line of action of the hump 706.

Figure 8:
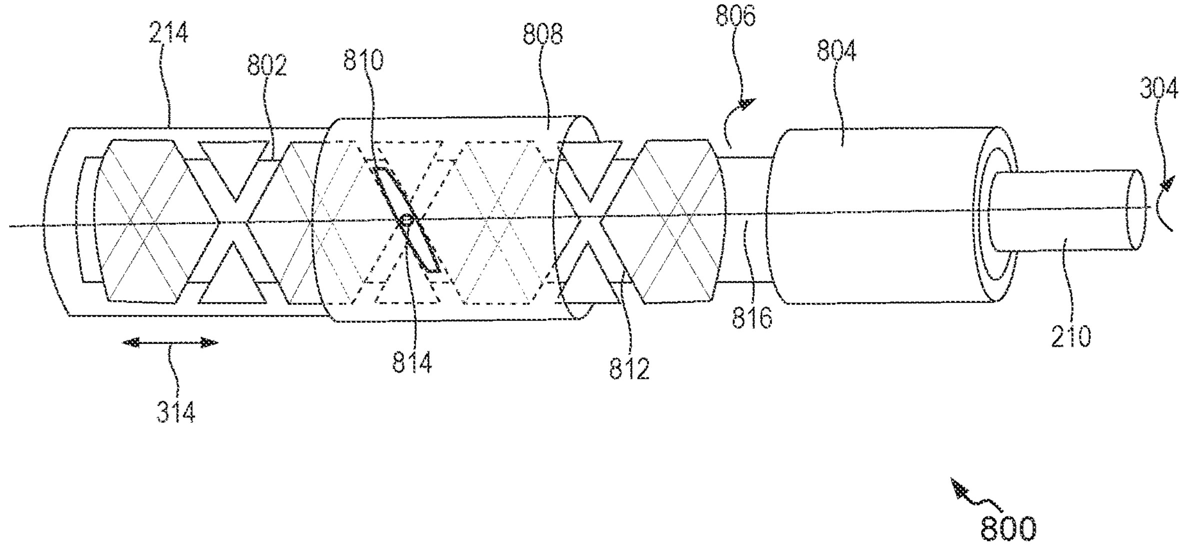
FIG. 8 illustrates a schematic representation of a reciprocating motion structure of a sexual stimulation massage apparatus according to another embodiment.

FIG. 8 illustrates a schematic representation of a reciprocating motion structure 800 of the sexual stimulation massage apparatus 100 according to another embodiment. The reciprocating motion structure 800 includes a screw rod 802, a coupler 804, a slider 808, and a crescent plate 810. In one embodiment, the rotating shaft 210 of the motor 206 is coupled with the screw rod 802 using a suitable coupler 804. The construction and working of the rotating shaft 210 and the coupler 804 are already explained in detail with reference to FIG. 2A, and therefore they are not reiterated for the sake of brevity.

The screw rod 802 is configured to rotate in a rotational direction 806 with respect to the pre-specified direction 304 of the rotating shaft 210. The rotational direction 806 of the screw rod 802 is converted into the reciprocating movement 314 of the moving rod 214 through the crescent plate 810 and the slider 808. As shown, the screw rod 802 is cylindrical in shape and formed with a bidirectional thread 812. The bidirectional thread 812 is configured to provide a channel for the movement of the crescent plate 810. The crescent plate 810 is a piece of metal that accommodates at least a portion of the bidirectional thread 812 of the screw rod 802. The geometrical profile of the crescent plate 810 is designed considering a clearance fit between bidirectional thread 812 of the screw rod 802 and the crescent plate 810. The crescent plate 810 easily slides within the bidirectional thread 812 of the screw rod 802 without jamming or sticking the surfaces. The head of the crescent plate 810 is attached to the slider 808 using a pin 814. In other words, the slider 808 is in engagement with the screw rod 802 via the crescent plate 810 that is slidably positioned in the bidirectional thread 812 of the screw rod 802. The slider 808 is provided with a guideway (not shown in FIG) to reciprocate the slider 808 based on the rotational direction 806 of the screw rod 802. In one scenario, the bidirectional thread 812 of the screw rod 802 is a continuous thread and formed as bidirectional. The thread profile may be designed to transmit maximum torque with the least loss. In another scenario, the thread is a continuous thread formed of a left-hand helical groove and a right-hand helical groove connected to one another at either end of the screw rod 802 for providing sliding movement to the slider 808. Alternatively, a spiral thread may be formed on the screw rod 802. The moving rod 214 may be integrated or coupled with the slider 808 to form a single structure for movement of the stimulating structure 104 configured to stimulate the user's body in an effective manner.

In another embodiment, the rotating shaft 210 of the motor 206 may be fabricated with bidirectional thread 812 and eliminating the need for the coupler 804 and the screw rod 802. The bidirectional thread 812 produced on the rotating shaft 210 creates reciprocating movement 314 of the moving rod 214 by means of the slider 808 and the crescent plate 810. The reciprocation frequency of the moving rod 214 used for operating the stimulating structure 104 is directly proportional to the speed of rotation of the rotating shaft 210 of the motor 206 while the rotational speed is controlled by the controller 204 that is used to alter the predetermined extension position of the stimulating massager to accommodate within the stimulating structure 104. In an embodiment, the stimulating structure 104 may integrate or couple with the screw rod 802 that is being coupled with the slider 808 along coaxial direction 816 of the screw rod 802.

Various embodiments of the disclosure, as discussed above, may be practiced with steps and/or operations in a different order, and/or with hardware elements in configurations, which are different from those which are disclosed. Therefore, although the disclosure has been described based upon these exemplary embodiments, it is noted that certain modifications, variations, and alternative constructions may be apparent and well within the scope of the disclosure.

Although various exemplary embodiments of the disclosure are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A sexual stimulation massage apparatus, comprising:
a body;
a reciprocating motion structure disposed within the body, the reciprocating motion structure comprising a rotational structure and a linear motion structure mechanically coupled with each other;
a motor comprising a rotating shaft mechanically coupled with the rotational structure to rotate the rotational structure thereby imparting a reciprocating motion to the linear motion structure;
a stimulating structure operatively coupled with the linear motion structure, the stimulating structure being configured to be insertable into a human body and to provide sexual stimulation to the human body based on the reciprocating motion of the linear motion structure;
a power source configured to provide electric power to the motor for rotating the rotating shaft; and
a controller configured at least to control operation of the motor,
wherein:
the linear motion structure is coupled to the rotational structure by a connection link configured to alter a stroke of the linear motion structure, and
the stroke of the linear motion structure has a stroke length within a range of 12 mm to 15 mm, thereby resulting in a frequency of impact of the stimulating structure at 1000 to 3000 times per minute.

2. The sexual stimulation massage apparatus of claim 1, further comprising a limiting structure through which the linear motion structure passes, thereby limiting the reciprocating motion of the linear motion structure.

3. The sexual stimulation massager of claim 1, wherein:
the stimulating structure comprises a conductive contact,
the linear motion structure comprises a moving rod comprising a contact base electrically connected to the power source, and
the conductive contact of the stimulating structure is electrically coupled to the contact base of the moving rod to provide the electric power to the stimulating structure.

4. The sexual stimulation massage apparatus of claim 3, wherein a proximal end of the moving rod is coupled via a snap-on connector with a sexual stimulator that has a predetermined shape and that is configured to reciprocate within a vagina of a user's body to create sensational pleasure to the user's body.

5. The sexual stimulation massage apparatus of claim 1, wherein:

the rotational structure comprises a screw rod having a unidirectionally reciprocating closed-up groove, the linear motion structure comprises a crescent plate, and the linear motion structure is coupled to the unidirectionally reciprocating closed-up groove of the screw rod through the crescent plate and is configured to provide the reciprocating motion to the linear motion structure along a coaxial direction of the screw rod.

6. The sexual stimulation massage apparatus of claim 1, wherein the sexual stimulation to the human body includes at least one of a vibration stimulation, a temperature stimulation, a rotation stimulation, a sucking stimulation, an expansion and contraction stimulation, a telescopic stimulation, and an impact stimulation.

7. The sexual stimulation massage apparatus of claim 1, wherein:

the linear motion structure comprises a moving rod, the rotational structure comprises an eccentric cam mechanically fastened with at least one connection point eccentrically disposed with respect to a rotation center of the eccentric cam, and the eccentric cam is mechanically coupled with the moving rod via a connection link.

8. The sexual stimulation massage apparatus of claim 7, wherein the connection link is provided at least with a connection groove configured to couple with the eccentric cam using the at least one connection point.

9. The sexual stimulation massage apparatus of claim 8, wherein the connection link is coupled with the moving rod, thereby resulting in the moving rod reciprocating as the eccentric cam rotates.

* * * * *